(12) United States Patent
Philips et al.

(10) Patent No.: US 10,655,753 B2
(45) Date of Patent: May 19, 2020

(54) HYDRAULIC VALVE

(71) Applicant: CLAVERHAM LIMITED, Shirley, Solihull, England (GB)

(72) Inventors: Jamie Philips, Bristol (GB); Reg Raval, Bristol (GB)

(73) Assignee: CLAVERHAM LTD., Bristol (GB)

( * ) Notice: Subject to any disclaimer, the term of this patent is extended or adjusted under 35 U.S.C. 154(b) by 15 days.

(21) Appl. No.: 15/348,292

(22) Filed: Nov. 10, 2016

(65) Prior Publication Data
US 2017/0152966 A1 Jun. 1, 2017

(30) Foreign Application Priority Data

Dec. 1, 2015 (EP) .................................... 15275243

(51) Int. Cl.
| | |
|---|---|
| *F16K 37/00* | (2006.01) |
| *F15B 13/16* | (2006.01) |
| *F16K 31/40* | (2006.01) |
| *F16K 31/383* | (2006.01) |
| *F15B 13/043* | (2006.01) |
| *F16K 11/07* | (2006.01) |

(Continued)

(52) U.S. Cl.
CPC ...... *F16K 37/0041* (2013.01); *F15B 13/0436* (2013.01); *F15B 13/16* (2013.01); *F16K 11/0716* (2013.01); *F16K 31/383* (2013.01); *F16K 31/406* (2013.01); *F16K 31/426* (2013.01); *F15B 2013/0409* (2013.01); *F15B 2013/0412* (2013.01)

(58) Field of Classification Search
CPC ............. F16K 11/0716; F16K 11/0712; F16K 37/0041; F16K 37/0033; Y10T 137/86614; Y10T 137/8275; Y10T 137/8671; Y10T 137/2322; Y10T 137/2409; F15B 2013/0409; F15B 13/0402; F15B 13/0436; F15B 13/16; F15B 15/2815; F15B 15/2853
See application file for complete search history.

(56) References Cited

U.S. PATENT DOCUMENTS 3,329,159 A * 7/1967 Herion ................ F15B 13/0431
137/556
3,665,807 A * 5/1972 Bartholomaus ........... F15B 9/14
91/35

(Continued)

FOREIGN PATENT DOCUMENTS

| DE | 2343662 A1 | 3/1975 |
|---|---|---|
| DE | 3738241 A1 | 5/1989 |
| DE | 10108536 A1 | 4/2002 |

OTHER PUBLICATIONS

European Search Report for Application No. 15275243.2-1754 dated May 31, 2016. 7 Pages.

*Primary Examiner* — Reinaldo Sanchez-Medina
*Assistant Examiner* — Nicole Gardner
(74) *Attorney, Agent, or Firm* — Cantor Colburn LLP

(57) ABSTRACT

An electrohydraulic spool valve, comprising: a spool, axially movable within a manifold; a position feedback system provided at a first end of the spool; and an end cap provided on said first end so as to form a first high pressure reservoir between the end cap and the first end of the spool. The end cap provided on the end of the spool partly defines the high pressure reservoir by containing the high pressure fluid in the vicinity of the spool end.

7 Claims, 2 Drawing Sheets

(51) Int. Cl.
*F16K 31/42* (2006.01)
*F15B 13/04* (2006.01)

(56) References Cited

U.S. PATENT DOCUMENTS

| | | |
|---|---|---|
| 3,875,849 A | 4/1975 | Patel |
| 4,567,813 A | 2/1986 | Garnjost |
| 7,475,537 B2 | 1/2009 | Spickard |
| 8,739,680 B2 | 6/2014 | Reust |
| 8,800,594 B2 | 8/2014 | Futa et al. |
| 2013/0221253 A1 | 8/2013 | Frick et al. |

* cited by examiner

HYDRAULIC VALVE

FOREIGN PRIORITY

This application claims priority to European Patent Application No. 15275243.2 filed Dec. 1, 2015, the entire contents of which is incorporated herein by reference.

TECHNICAL FIELD

This disclosure relates to hydraulic spool valves (also referred to as hydraulic servo valves), particularly Electro-Hydraulic Servo Valves (EHSV) that convert small electrical signals into proportional hydraulic flow. Such valves are often used in aerospace applications, although they also have applications in other fields.

BACKGROUND

EHSVs achieve good performance in steady state situations. However, problems have been identified in start-up transients during which spool valves have been slow to take up their commanded position. In some case of primary servos for the main and tail rotors of helicopters, this slow response can cause the Flight Control Computer (FCC) to shut down a hydraulic system.

Two conventional EHSVs are shown in FIGS. 1a and 1b respectively. FIG. 1a shows an EHSV with no electrical feedback while FIG. 1b shows an EHSV with electrical feedback. More specifically FIGS. 1a and 1b show a two stage ElectroHydraulic Servo Valve (EHSV). The EHSV 1 converts small electrical signals into proportional hydraulic flow. The first stage 2 consists of a torque motor 3, jet pipe 4 and receivers 5. The second stage 6 consists of a manifold 7 that houses the flow control valve 8 (i.e. the spool). Small electrical currents applied to the torque motor 3 cause the torque motor 3 to rotate the jet pipe 4 either to the left or to the right (as shown in the figure). These angular movements of the jet pipe 4 direct fluid from the high pressure supply PS (provided through pipe 13) and through either a first conduit 9 leading to a first end face 10 of the spool 8 or through a second conduit 11 leading to a second end face 12 of the spool 8. Any leakage at the jet pipe 4 passes through return line PR.

As the pressure on one end face (10 or 12) of the spool 8 is increased, the spool 8 is caused to move within the manifold 7. For example, if the jet pipe 4 is rotated so that it is directed to the left in FIG. 1 a, high pressure fluid is fed to first end face 10 of spool 8 which causes the spool 8 to move to the right. This movement of spool 8 permits high pressure fluid from supply PS to flow through first chamber outlet C1. On the other hand, if the jet pipe 4 is rotated so that it is directed to the right in FIG. 1a, high pressure fluid is fed to the second end face 12 of spool 8 which cause the spool 8 to move to the left. This movement of spool 8 permits high pressure fluid from supply PS to flow through second chamber outlet C2. Feedback wire 14 is a spring connected between the jet pipe 4 and to the centre of spool 8. As the spool 8 is driven towards its commanded position, it pulls the feedback wire 14 which in turn pulls the jet pipe 4 back towards the centre, balanced position once the desired position has been attained. All high pressure fluid that does not pass to the first chamber outlet C1 or the second chamber outlet C2 is drained through return circuit PR.

As illustrated in FIG. 1 a, the volume formed from first conduit 9 and first end face 10 is similar to the volume formed from second conduit 11 and second end face 12. Thus upon start up, the two opposed volumes fill/pressurize equally and the valve achieves a steady state quickly.

FIG. 1b shows an EHSV 1 with an electrical position feedback system 15. This system 15 supplements the closed loop feedback provided by feedback wire 14 and is also used for monitoring the current position of the spool 8 and for failure detection (e.g. by determining that spool position is not responsive to commands). However, as shown in FIG. 1b, the electrical position feedback system 15 is formed from a first sensor part 16 attached to the end face 10 of spool 8 and extending into second sensor part 17 which senses the axial movement of first sensor part 16 relative to second sensor part 17. The sensor parts 16, 17 may be of any form for detecting position, e.g. magnetic or capacitive. As can be seen in FIG. 1b, the volume of the fluid reservoir at end face 10 is significantly increased by the presence of the electrical position feedback system 15 compared with the volume of the fluid reservoir at the opposite end face 12. Moreover, this system 15 gives the reservoir a complex shape with a tortuous flow path for the fluid (e.g. oil) to flow around and through. Additionally, these areas can also be prone to air entrapment due to their blind nature. The effects of these features can result in a different time constant for the pressure at each end to stabilize upon rapid hydraulic start-up.

SUMMARY

According to this disclosure there is provided an electro-hydraulic spool valve, comprising: a spool, axially movable within a manifold; a position feedback system provided at a first end of the spool; and an end cap provided on said first end so as to form a first high pressure reservoir between the end cap and the first end of the spool.

The end cap provided on the end of the spool partly defines the high pressure reservoir by containing the high pressure fluid in the vicinity of the spool end. This has two main benefits. Firstly it restricts the volume compared to the volume of the whole electrical position feedback system. Secondly it removes the complex shape that is formed by the electrical position feedback system. The large and complex volume has been found to be the reason for the valve to perform inadequately during transient startup conditions. Removing this large and complex volume allows the reservoirs at the two opposite ends of the spool to fill with fluid quickly and at about the same rate, thus achieving a balanced state of the spool quickly.

Preferably the end cap forms a mechanical seal around said spool. The end cap is sufficiently tightly formed around the spool to restrict the high pressure flow, thus partially defining the reservoir, while at the same time allowing just enough fluid leakage across the seal to minimise friction as the spool moves with respect to the end cap. As fluid is directed into the reservoir to increase the pressure therein, the spool will be caused to move with respect to the end cap. Therefore minimising this friction is important. The mechanical seal will be similar to the mechanical seals that are formed along the length of the spool to separate the various pressure lines, return lines and other fluid connections from one another.

It will be appreciated that the complex volume of the position feedback system could be isolated by other sealing means, but such seals typically add friction and complexity that is undesirable in a spool valve. Spool valves are often very sensitive devices where added friction would cause operational problems. Also spool valves are often required to have a very long service life and therefore seal maintenance or replacement is undesirable. The mechanical seal which allows a small amount of leakage for lubrication is very low friction and very long lasting.

Preferably the end cap floats between the spool and the manifold (or the position feedback system which may conveniently form one end wall of the manifold). In other words the end cap is not attached either to the spool or to the manifold (or position feedback system), but is free to move with respect to them. In practice, once the valve is pressurized, the pressure between the spool end face and the inside of the end cap will press the end cap against the manifold wall (or position feedback system) as the fluid pressure outside the end cap is lower than inside.

The electrohydraulic spool valve preferably further comprises a conduit formed within the spool and providing a fluid connection to said first high pressure reservoir. The conduit connects a high pressure fluid line to the high pressure reservoir. By directing this high pressure fluid through the spool and out of the end face of the spool, the reservoir can be formed by the end cap around the end of the spool. This effectively separates the high pressure region from the large and complex volume of the electrical position feedback system which can instead be a low pressure region with no effect on the startup transient operation of the valve.

The conduit may comprise an axial drilling (axial conduit) providing a fluid connection with said first end and a radial drilling (radial conduit) providing a fluid connection with said axial drilling. Such drillings can be formed relatively easily and can be applied to existing spool valves. This reduces manufacturing cost. In particular it may not be necessary to redesign other parts of the manufacturing process as these new features are just additional steps to be added to the existing manufacturing process. The radial drilling may extend all the way through the diameter of the spool, intersecting the axial drilling.

The radial drilling may connect the axial drilling to an annular chamber on the surface of the spool. The annular chamber allows fluid flow around the circumference of the spool so that precise alignment of the radial drilling with the high pressure supply line is not necessary. Also, the annular chamber may be axially wider than the radial drilling so as to accommodate the axial movement of the spool during normal use without compromising fluid supply to the high pressure reservoir at the end of the spool. It will also be appreciated that the annular chamber could instead be formed in the manifold adjacent to the radial drilling.

The electrohydraulic spool valve preferably further comprises a first sensor part attached to the spool at a location between the radial drilling and the end cap. The conduit thus bypasses the sensor part to be able to fill the reservoir at the end face. The sensor part may then extend out past the end of the spool (i.e. extending axially) in a similar fashion to existing position feedback sensors, for interacting with a second sensor part attached to the manifold. This assembly (the first and second sensor parts) will still form a large and complex fluid volume, but it is now at low pressure connected to the system drain (return line) and thus does not influence the establishment of the high pressure at the spool end during startup transients. Thus the position feedback system is preferably located in a chamber that is separated from the high pressure supply via a mechanical seal between the end cap and the spool.

Preferably the first high pressure reservoir has a volume substantially the same as a second high pressure reservoir formed at a second, opposite end of the spool. Having these volumes the same means that upon startup they will fill at the same rate and achieve high pressure at about the same time, keeping the spool in a balanced state and reaching equilibrium quickly. This means that the spool will respond swiftly to commands upon startup without producing unwanted transient effects that might adversely affect the hydraulic systems which the valve controls. The volumes are preferably about equal when the spool is in a central, neutral position. Ideally, the volumes that need to be matched are the whole fluid system between the common fluid supply (e.g. a jet pipe) right up to the volumes either side of the spool (i.e. formed by the end cap at one end and the manifold at the other). These volumes include the supply lines to the end faces and, in the case of the end with the end cap, the volume of any drillings and annular chambers in the spool. Preferably these volumes should be within 10% of one another, more preferably within 5%.

This disclosure is particularly advantageous in relation to aircraft (especially helicopter) flight controls, but it will be appreciated that the teaching is more general than that and can also be applied to other hydraulic valve applications and will be useful anywhere that startup transients may be an issue.

BRIEF DESCRIPTION OF DRAWINGS

One or more non-limiting examples will now be described, by way of example only, and with reference to the accompanying figures in which:

FIG. 2 is similar to FIGS. 1a and 1b and the same reference numbers will be used to denote the same or similar parts. FIG. 2 shows a two stage ElectroHydraulic Servo Valve (EHSV) 1. As with the devices shown in FIGS. 1a and 1b, the device of FIG. 2 converts small electrical signals into proportional hydraulic flow. The first stage 2 consists of a torque motor 3, jet pipe 4 and receivers 5. The second stage 6 consists of a manifold 7 that houses the flow control valve 8 (i.e. the spool).

Figure 1A:
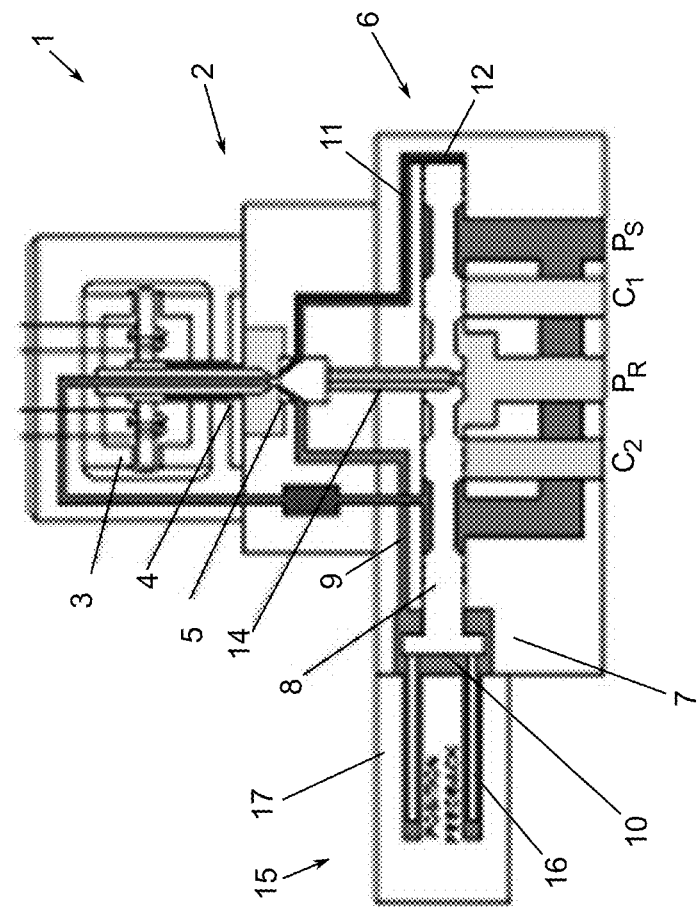
FIGS. 1a and 1b show existing electrohydraulic spool valves.

The EHSV 1 converts small electrical signals into proportional hydraulic flow. The first stage 2 consists of a torque motor 3, jet pipe 4 and receivers 5. The second stage 6 consists of a manifold 7 that houses the flow control valve 8 (i.e. the spool). Small electrical currents applied to the torque motor 3 cause the torque motor 3 to rotate the jet pipe 4 either to the left or to the right (as shown in the figure). These angular movements of the jet pipe 4 direct fluid from the high pressure supply PS (provided through pipe 13) and through either a first conduit 9 leading to a first end face 10 of the spool 8 or through a second conduit 11 leading to a second end face 12 of the spool 8. Any leakage at the jet pipe 4 passes through return line PR.

As the pressure on one end face (10 or 12) of the spool 8 is increased, the spool 8 is caused to move within the manifold 7. For example, if the jet pipe 4 is rotated so that it is directed to the left in FIG. 2, high pressure fluid is fed to first end face 10 of spool 8 which causes the spool 8 to move to the right. This movement of spool 8 permits high pressure fluid from supply PS to flow through first chamber outlet C1. On the other hand, if the jet pipe 4 is rotated so that it is directed to the right in FIG. 2, high pressure fluid is fed to the second end face 12 of spool 8 which cause the spool 8 to move to the left. This movement of spool 8 permits high pressure fluid from supply PS to flow through second chamber outlet C2. Feedback wire 14 is a spring connected between the jet pipe 4 and to the centre of spool 8. As the spool 8 is driven towards its commanded position, it pulls the feedback wire 14 which in turn pulls the jet pipe 4 back towards the centre, balanced position once the desired position has been attained. All high pressure fluid that does not pass to the first chamber outlet C1 or the second chamber outlet C2 is drained through return circuit PR.

In other words, current applied to the torque motor 3 results in angular displacement of the jet pipe 4 and an imbalance of pressure at the spool ends 10, 12. This pressure and subsequent load imbalance is reacted by the feedback wire 14 and the spool 8 displaces until the forces are equalized by re-centralizing the jet pipe 4.

Figure 1B:
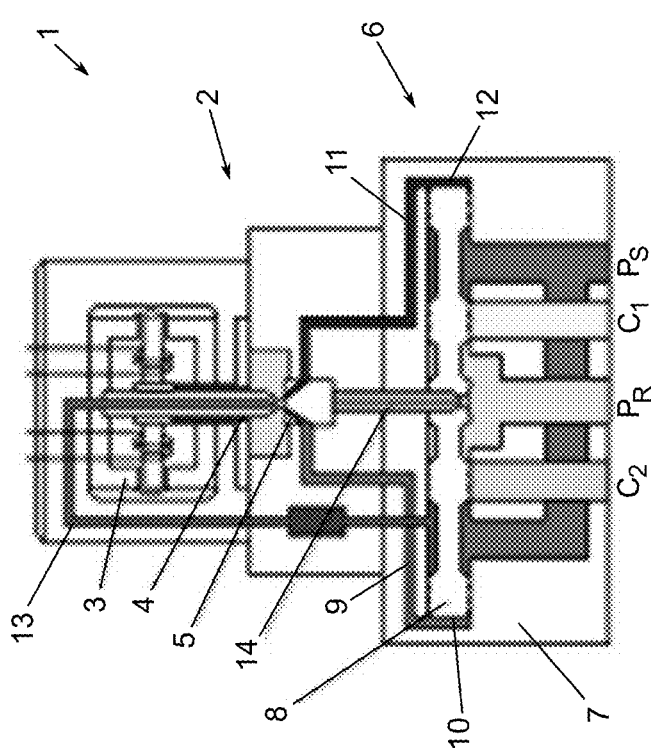

As mentioned above, EHSVs are utilized both with and without electrical spool position feedback (as illustrated in FIGS. 1a and 1b). Electrical position feedback provides additional robustness in the form of increased disturbance rejection into the control loop and provides failure monitoring capability.

With known electrical position feedback systems such as that shown in FIG. 1b, during the very rapid start-up of a hydraulic system, the control valve (spool) 8 momentarily appears to be out of control and does not follow its commanded signal. The valve spool 8 moves in a direction towards the larger complex volume of oil (where the electrical position feedback is attached) which in turn connects PS to C1 causing the ram (not shown, but driven via conduits C1 and C2) to displace.

This is because the provision of an electrical spool position feedback results in a complex shape at the position feedback end 10 of the spool 8 (as shown in FIG. 1b) and un-equal volume of fluid at each end (end 10 versus end 12). These areas can also be prone to air entrapment due to their blind nature. The effect of these features can result in a different time constant for the pressure at each end (10, 12) to stabilize.

Figure 2:
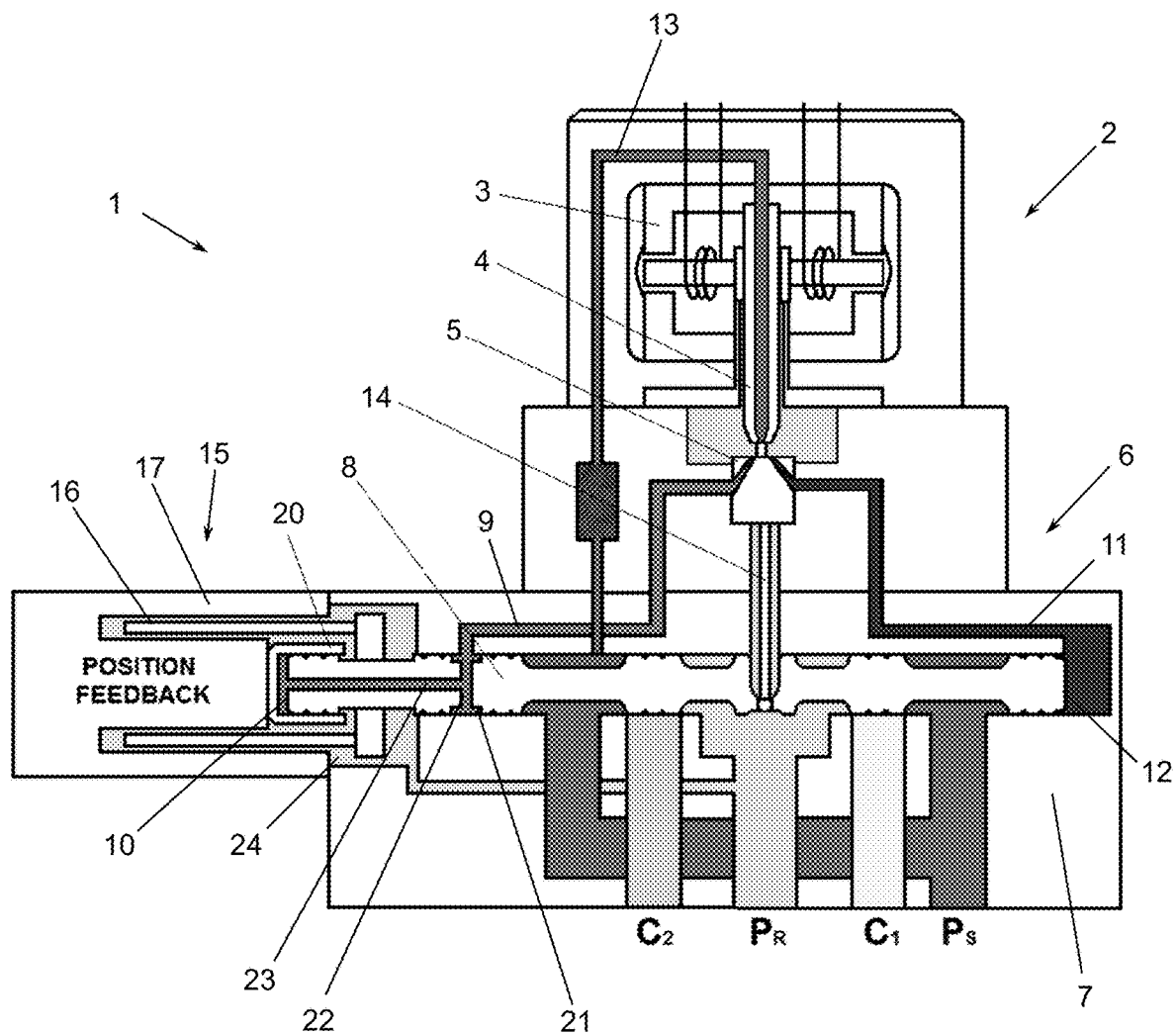
FIG. 2 illustrates an example of this disclosure.

The example shown in FIG. 2 addresses this problem. To equalise and simplify the volumes at the spool ends (10, 12), the position feedback device 15 needs to be isolated from the spool end chamber circuit (9, 10). To achieve this, the matched spool 8 is extended beyond the attachment point of the feedback device 16 (first sensor part). The hydraulic circuit is diverted through the middle of the spool 8 via an annular chamber 21, an axial drilling 23 and a radial drilling 22 that connects the axial drilling 23 with the annular chamber 21. The hydraulic circuit is then closed off by the addition of an end cap 20. The load on the end cap 20 (pressure×spool area) is reacted by the feedback device 15. The feedback device 15 is attached to the spool 8 at an axial location in between the end cap 20 and the annual chamber 21 so that the combination of the chamber 21 and drillings 22, 23 bypasses the first sensor part 16, thereby reaching the end face 10 without passing the cavity 24 in which the feedback device 15 is located. The cavity 24 in which the feedback device 15 is located is then connected to the return circuit PR to prevent pressure from building up from leakage across the matched spool 8. This simplifies the complex fluid volume at the feedback device 15 and equalises the volume at each end 10, 12 of the spool 8, ensuring both ends 10, 12 of the spool 8 are pressurised simultaneously thus eliminating the start-up issue.

Whilst not all two stage EHSVs are designed with electrical position feedback (e.g. system 15), in critical applications like primary flight controls, a feedback device 15 is often utilised to provide a more robust closed loop control and to provide additional failure monitoring capability. In these applications it may also be particularly important to minimise transients during hydraulic start-up. The design shown in FIG. 2 allows the EHSV to have equal volumes of fluid at each spool end 10, 12 and also ensures that both fluid circuits (9, 10 and 11, 12) do not contain complex shapes, ensuring when pressure is rapidly applied there is no spool imbalance. Thus this example results in minimal transient disturbances. This example (or variations thereof) could also be used in commercial aerospace and non-aerospace hydraulic applications to overcome system start-up transients.

The invention claimed is:

1. An electrohydraulic spool valve, comprising:
a spool, axially movable within a manifold, wherein the spool comprises an axial conduit providing a fluid connection with a first end face of the spool and a radial conduit providing a fluid connection with said axial conduit;
a position feedback system provided at the first end of the spool, wherein the position feedback system is in a lower pressure region which is fluidly connected to a system drain; and
an end cap provided on said first end so as to form a mechanical seal around the spool and thereby separate the lower pressure region from a first higher pressure reservoir between the end cap and the first end of the spool,
wherein the position feedback system comprises a first sensor part attached to the spool at a location between said radial conduit and said end cap, such that the axial conduit bypasses the first sensor part.

2. An electrohydraulic spool valve as claimed in claim 1, wherein said end cap floats between said spool and said manifold.

3. An electrohydraulic spool valve as claimed in claim 1, wherein said radial conduit connects the axial conduit to an annular chamber on the surface of the spool.

4. An electrohydraulic spool valve as claimed in claim 1, wherein said position feedback system is located in a chamber that is separated from a higher pressure supply via a mechanical seal between the end cap and the spool.

5. An electrohydraulic spool valve as claimed in claim 1, wherein the volume of the first high pressure reservoir together with associated supply conduits of the first higher pressure reservoir has a volume substantially the same as a second high pressure reservoir formed at a second, opposite end of the spool together with associated supply conduits of the second higher pressure reservoir.

6. An electrohydraulic spool valve as claimed in claim 5, wherein the two volumes are within 10%.

7. An electrohydraulic spool valve as claimed in claim 5, wherein the two volumes are within 5% of each other.

* * * * *